(No Model.)

E. M. HEWETT.
ELECTRIC BATTERY.

No. 385,308. Patented June 26, 1888.

Witnesses.
Howard F. Eaton,
Fred L. Emery.

Inventor.
Ernest M. Hewett.
by Crosby Gregory.
Attys.

N. PETERS, Photo-Lithographer, Washington, D. C.

UNITED STATES PATENT OFFICE.

ERNEST M. HEWETT, OF NEWTON, ASSIGNOR TO DANIEL W. CROSBY, TRUSTEE, OF BOSTON, MASSACHUSETTS.

ELECTRIC BATTERY.

SPECIFICATION forming part of Letters Patent No. 385,308, dated June 26, 1888.

Application filed November 15, 1887. Serial No. 255,194. (No model.)

*To all whom it may concern:*

Be it known that I, ERNEST M. HEWETT, of Newton, county of Middlesex, and State of Massachusetts, have invented an Improvement in Electric Batteries, of which the following description, in connection with the accompanying drawings, is a specification, like letters on the drawings representing like parts.

This invention has for its object to construct an electric battery which possesses high electro-motive force and low internal resistance and great constancy of current.

The invention consists in the combination, with a zinc electrode placed in a solution of sal-ammoniac contained in a porous cup, of an external acid-receiving vessel in which the porous cup containing the zinc electrode is placed, and a copper electrode made as a cylinder and placed in the acid-receiving vessel between the walls thereof and the porous cup, said copper electrode having an external rim or flange intermediate its length, which bears against the wall of the acid-receiving vessel, to thereby form a crystal-receiving chamber or pocket, the said flange and the lower wall of the copper cylinder being perforated to permit the fluid to percolate freely therethrough. The porous cup is composed, essentially, of infusorial earth, which is mixed with some good binding material—such as the ordinary clay employed for such purposes—such composition being very absorptive and aiding to materially reduce the internal resistance of the battery. The zinc bar or plate is preferably made as a flat plate bent or rolled into cylindrical form; yet any other form may be employed, said zinc being amalgamated, preferably by the method described in an application, Serial No. 255,230, filed by me November 15, 1887.

Figure 1:
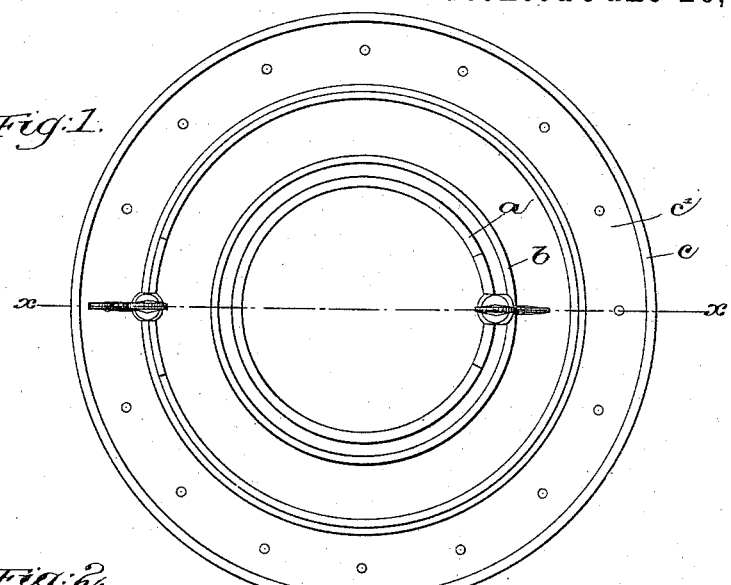
Figure 2:
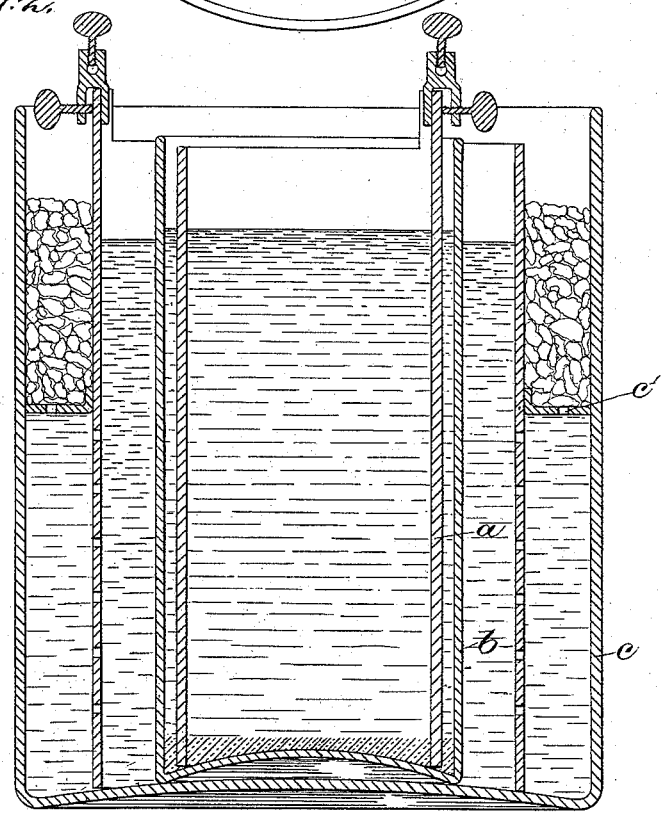

Figure 1 is a top view of the battery embodying this invention, the material contained in it being removed; and Fig. 2 shows in vertical section taken on the dotted line $x$ $x$ the battery shown in Fig. 1.

The zinc electrode $a$, preferably made as a flat plate and bent or rolled into cylindrical form, is amalgamated, preferably by the method described in the application above referred to. The porous cup $b$, having a convex bottom, contains a small quantity of mercury, and the zinc electrode is placed in this porous cup, the lower edge of the zinc touching the mercury. The porous cup is filled with a solution of sal-ammoniac containing a small quantity of sulphate of mercury. The porous cup is composed of infusorial earth as a principal constituent and any suitable binding material—such as common clay—to thereby provide a cup having great absorptive properties. The porous cup $b$ is placed in an acid-receiving jar or vessel, $c$, made of hard rubber, glazed pottery, glass, or any other suitable material, the solution employed being composed principally of a saturated solution of blue-vitriol and containing a small per cent. of sulphuric acid. The copper electrode of the battery is preferably made as a tubular cylinder, and is placed in the acid-receiving jar or vessel $c$, between it and the porous cup. A rim or flange, $c'$, is formed upon the exterior of the copper cylinder at a point about midway its height, which is of sufficient width to bear against the wall of the acid-receiving jar or vessel, to thereby form a chamber or pocket which first receives the blue-vitriol crystals. The said flange or rim is perforated to permit the fluid to percolate freely through it. That part of the copper cylinder below the flange is also perforated to permit the fluid to pass through it. The perforations are made very small.

It is obvious that the flange or rim may be made integral with or attached to the interior of the acid-receiving jar instead of to the copper cylinder, as shown.

In practice it has been found that the porous cup, composed mainly of infusorial earth, is so absorptive that the action set up is so free that the internal resistance of the battery is reduced to a minimum, and the solutions employed in contact with the large-surfaced electrodes enables the production of a battery of high electro-motive force.

I claim—

1. In an electric battery, a positive electrode or negative pole and a porous cup containing it, composed, essentially, of infusorial earth, combined with an acid-receiving jar or vessel, $c$, and a negative electrode or positive pole interposed between the porous cup and the acid-receiving jar or vessel, substantially as described.

2. In an electric battery, the zinc electrode and the porous cup containing it, combined with the acid-receiving jar or vessel c, the copper electrode having a perforated lower part, and the perforated flange c', substantially as described.

3. In an electric battery, the acid-receiving jar and the copper electrode, made, substantially as described, to form the crystal-receiving chamber or pocket, and the chamber beneath it, through which the fluid passes, combined with a porous cup contained within the copper electrode and the zinc electrode contained within the porous cup, substantially as described.

4. In an electric battery, a porous cup composed, essentially, of infusorial earth, substantially as described.

In testimony whereof I have signed my name to this specification in the presence of two subscribing witnesses.

ERNEST M. HEWETT.

Witnesses:
BERNICE J. NOYES,
B. DEWAR.